United States Patent
Denis-Courmont et al.

(10) Patent No.: US 9,154,369 B2
(45) Date of Patent: Oct. 6, 2015

(54) METHOD, APPARATUS AND SOFTWARE FOR PACKET MODIFICATION

(75) Inventors: Remi Denis-Courmont, Espoo (FI); Aki Petteri Niemi, Helsinki (FI); Kai Kalervo Vehmanen, Tampere (FI)

(73) Assignee: Nokia Technologies Oy, Espoo (FI)

( * ) Notice: Subject to any disclaimer, the term of this patent is extended or adjusted under 35 U.S.C. 154(b) by 120 days.

(21) Appl. No.: 12/808,276

(22) PCT Filed: Oct. 1, 2008

(86) PCT No.: PCT/EP2008/063160
§ 371 (c)(1),
(2), (4) Date: Jul. 22, 2010

(87) PCT Pub. No.: WO2009/059851
PCT Pub. Date: May 14, 2009

(65) Prior Publication Data
US 2010/0322238 A1    Dec. 23, 2010

Related U.S. Application Data

(60) Provisional application No. 60/996,305, filed on Nov. 9, 2007.

(51) Int. Cl.
*H04L 29/12* (2006.01)
*H04L 29/06* (2006.01)

(52) U.S. Cl.
CPC .......... *H04L 29/1249* (2013.01); *H04L 61/256* (2013.01); *H04L 61/2592* (2013.01);
(Continued)

(58) Field of Classification Search
CPC ... H04L 69/16; H04L 69/161; H04L 12/4633; H04L 29/12009
USPC ......... 370/229, 230, 235, 252, 328, 338, 352, 370/389, 392, 401
See application file for complete search history.

(56) References Cited

U.S. PATENT DOCUMENTS 6,076,113 A * 6/2000 Ramanathan et al. ........ 709/235
2001/0009554 A1  7/2001 Katseff et al.
(Continued)

FOREIGN PATENT DOCUMENTS

WO    03083692 A    10/2003
WO    2006095451 A   9/2006

OTHER PUBLICATIONS

Tuexen et al., "UDP Encapsulation of SCTP Packets draft-tuexen-sctp-udp-encaps-00.txt", Network Working Group, Internet-Draft, Oct. 17, 2005.
International Search Report and Written Opinion of the International Searching Authority for PCT Application No. PCT/EP2008/063160, dated Apr. 23, 2009, 14 pages.
Seguineau, "What's behind GTalk file transfer?", Aug. 17, 2006 http://mail.jabber.org/pipermail/standards/2006-August/012005.html.
(Continued)

*Primary Examiner* — Jung Park
(74) *Attorney, Agent, or Firm* — Harrington & Smith

(57) ABSTRACT

Embodiments provide an apparatus, method and software configured to modify a transmission control protocol packet so as to become a user datagram protocol datagram, or to modify a user datagram protocol datagram so as to become a transmission control protocol packet. An embodiment uses a mapping between TCP packet format, such as TCP wire packet format, and an UDP-encapsulated TCP packet format, such as UDP-encapsulated TCP wire packet format, allowing direct re-use of any TCP protocol implementation. TCP frames can be modified into valid UDP datagrams before being transmitted, and inverse modifications can be done when receiving datagrams from the network.

19 Claims, 2 Drawing Sheets

Figure 1:
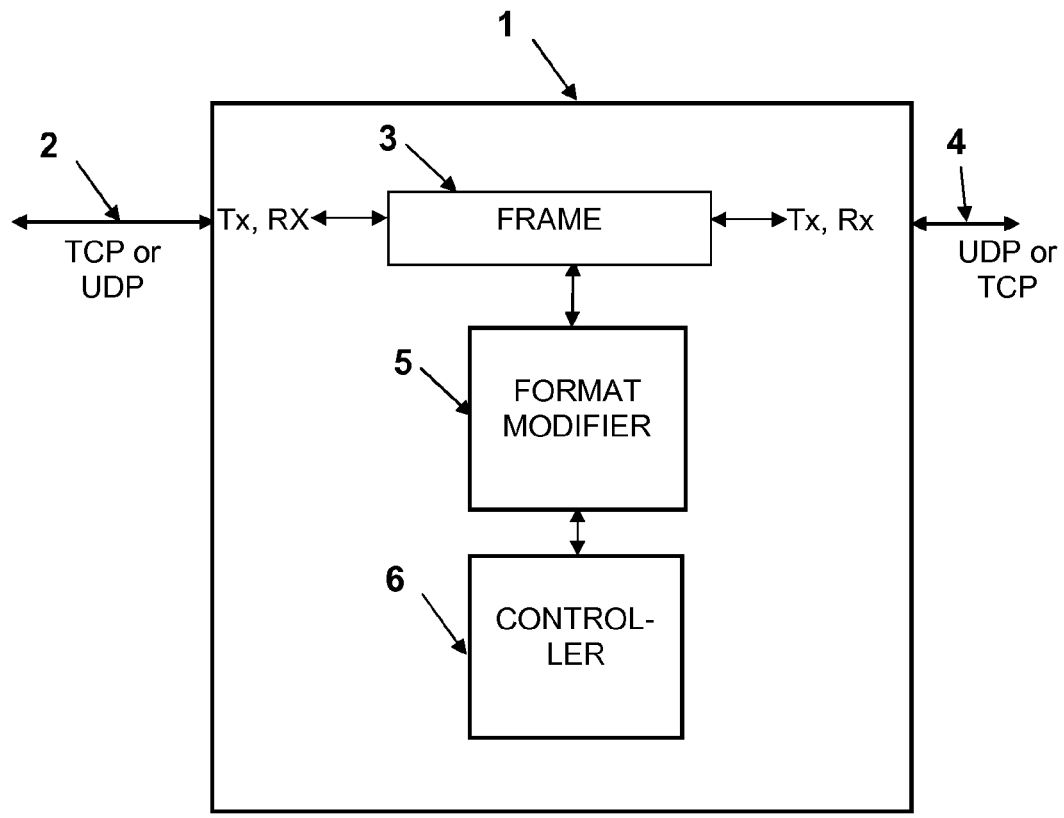

(52) U.S. Cl.
CPC .............. *H04L63/029* (2013.01); *H04L 69/08* (2013.01); *H04L 69/16* (2013.01); *H04L 69/161* (2013.01); *H04L 69/164* (2013.01); *H04L 69/165* (2013.01)

(56) References Cited

U.S. PATENT DOCUMENTS

| | | | | |
|---|---|---|---|---|
| 2003/0007475 | A1* | 1/2003 | Tsuda et al. | 370/338 |
| 2005/0018666 | A1* | 1/2005 | Davila et al. | 370/389 |
| 2005/0192782 | A1* | 9/2005 | Lee | 703/2 |
| 2006/0047788 | A1* | 3/2006 | Sakai | 709/220 |
| 2006/0256817 | A1* | 11/2006 | Durst | 370/466 |
| 2010/0189049 | A1* | 7/2010 | Lim et al. | 370/329 |
| 2012/0020293 | A1* | 1/2012 | Nix et al. | 370/328 |
| 2012/0042027 | A1* | 2/2012 | Abuan et al. | 709/206 |

OTHER PUBLICATIONS

Srisuresh Kazeon Systems B Ford M I T D Kegel Kegel Com P: State of Peer-to-Peer (P2P) Communication Across Network Address Translators (NATs); IETF Standard Working Draft, Internet Engineering Task Force, IETF, No. 4, Sep. 26, 2007.

RFC 768; J. Postel; ISI; Aug. 28, 1980; *User Datagram Protocol* (4 pages).

RFC: 793; *Transmission Control Protocol*; DARPA Internet Program Protocol Specification Sep. 1981 prepared by Information Sciences Institute University of Southern California (92 pages).

R. Stewart, et al,; Network Working Group; Request for Comments: 2960; Category: Standards Track; Oct. 2000; *Stream Control Transmission Protocol* (135 pages).

Rosenberg, et. Al.; Network Working Group; Request for Comments: 3261; Category: Standards Track; Jun. 2002; (270 pages).

\* cited by examiner

METHOD, APPARATUS AND SOFTWARE FOR PACKET MODIFICATION

RELATED APPLICATION

This application was originally filed as PCT Application No. PCT/EP2008/063160 on Oct. 1, 2008 and claims priority to U.S. Provisional Application No. 60/996,305 filed on Nov. 9, 2007, which is incorporated herein by reference in its entirety.

FIELD OF TECHNOLOGY AND BACKGROUND

Due to security concerns and/or scarcity of Internet protocol version 4, IPv4, addresses, network address port translation, NAPT and stateful firewalls are frequently deployed on IP networks, limiting peer-to-peer connectivity. Still, in many cases UDP packets (UDP, user datagram protocol as described in RFC768) can be exchanged between NATed/firewalled nodes, using an out-of-band signaling mechanism (e.g. session initiation protocol, SIP) and e.g. a "hole punching" mechanism such as ICE, interactive connection establishment as described in IETF draft-ietf-mmusic-ice. IETF stands for Internet Engineering Task Force, address http://www.ietforg. ICE makes use of the session traversal utilities for network address translation, STUN, protocol and its extension, and traversal using relay network address translation, TURN. ICE can be used by any protocol utilizing the offer/answer model, such as the session initiation protocol, SIP.

UDP does not provide any kind of reliability or congestion control, making it only suitable e.g. for loss-tolerant real-time data (e.g. voice).

For reliable and fast transfers, the transport control protocol, TCP as described in IETF RFC793, may be used. A stream control transmission protocol, SCTP, of RFC2960 or other protocols may also be used.

Peer-to-peer TCP (using TCP Simultaneous Open) as specified in ICE-TCP does not work through as many network address translations, NATs/firewalls as peer-to-peer UDP.

ICE-TCP (IETF draft-ietf-mmusic-ice-tcp) proposes the use of TCP Simultaneous Open, whereby the two ends send normal TCP connection requests to each other at the same time. However, different NATs models e.g. from different vendors do not allow TCP Simultaneous Open.

SUMMARY

Embodiments of the invention provide a method, apparatus and software routines or program allowing to transmit data orderly and reliably (e.g. with congestion control and retransmission), as with usual TCP through IP networks when both the sender and receiver are located behind a NAT or stateful firewall.

The disclosed method and apparatus in accordance with embodiments of the invention work through a large number of NAT and firewall devices, and through larger sets of deployed NAT and firewall devices than e.g. the TCP simultaneous open mechanism.

The described method and apparatus in accordance with embodiments of the invention can be extended to provide SCTP traversal support in addition to TCP.

One or more embodiments provide an apparatus or method for reusing data found in the UDP header to avoid redundancy between the UDP header and the TCP/SCTP headers, as well as to avoid increasing the overhead. Thus an improved version of TCP encapsulation on top of UDP is provided.

One or more embodiments of the invention provide a mechanism for modifying TCP/IP packets, e.g. on the wire or during or for transport, so they pass as valid UDP datagrams. The one or more embodiments benefit from the same level of NAT/firewall traversal success as UDP, rather than TCP Simultaneous Open. This allows reliable, congestion-controlled and bandwidth-efficient data transfers even if both sides of the communication are behind NATs/firewalls.

Embodiments according to this solution use a mapping between TCP packet format, such as TCP wire packet format, and an UDP-encapsulated TCP packet format, such as UDP-encapsulated TCP wire packet format, which allows direct re-use of any TCP protocol implementation. TCP frames are modified into valid UDP datagrams before being transmitted, and the inverse modifications are done when receiving datagrams from the network.

To support UDP hole punching, modified TCP frames can be multiplexed with STUN UDP packets, as used in the IETF ICE secure connectivity establishment mechanism.

An apparatus in accordance with one, more or all of the embodiments of the invention comprises a unit or modifier configured to modify a transmission control protocol packet so as to become a user datagram protocol datagram, or to modify a user datagram protocol datagram so as to become a transmission control protocol packet.

The unit or modifier may be configured to carry out at least one or more or all of the following modifications:

a transmission control protocol checksum, and optionally a bit indicating urgent mode and urgent pointer field are suppressed in a transmission control protocol packet to form a modified packet;

at least one of a user datagram protocol length, a user datagram protocol checksum, and a 1 bit are inserted into the modified packet, so that the resulting packet becomes like a valid user datagram protocol datagram;

a protocol number of a header of the resulting packet is set to a specific value for user datagram protocol.

The unit or modifier may also be configured to re-arrange at least one of a sequence number, acknowledgement sequence number, data offset, transmission control protocol flags, window, parameters. The user datagram protocol datagram may have the same length as the original transmission control protocol packet.

In the apparatus, the unit or modifier may be configured to multiplex modified transmission control protocol frames with user datagram protocol packets to support user datagram protocol hole punching.

Embodiments of the method, apparatus, unit or modifier can be configured to carry out one or more or all of the following, when receiving a user datagram protocol packet:
checking a length of a payload of the user datagram protocol packet,
checking a first bit of the payload when the length of the payload of the user datagram protocol packet is larger than a determined number of bytes,
checking the user datagram protocol checksum,
modifying the user datagram protocol packet to recover a transmission control protocol packet.

Embodiments of the method, apparatus, unit or modifier may be configured to deliver the packet unmodified, if the first bit of the payload is zero.

Embodiments of the method, apparatus, unit or modifier may be configured to ignore the packet, if the user datagram protocol checksum is invalid.

In the apparatus the modifications of the user datagram protocol packet to recover a transmission control protocol packet may include at least one of:

recomputing of the transmission control protocol checksum, assuming a bit indicating urgent mode, and urgent pointer to be zero, setting back a protocol value in the header, delivering the packet to a transmission control protocol state machine.

The apparatus can e.g. be a node, a part of a node, a module, a chipset, processor, computer or software module.

A method in accordance with one, more or all of the embodiments of the invention may comprise one or more of the following in any arbitrary combination:

modifying a transmission control protocol packet so as to become a user datagram protocol datagram, or modifying a user datagram protocol datagram so as to become a transmission control protocol packet, carrying out at least one or more or all of the following:

a transmission control protocol checksum, and optionally a bit indicating urgent mode and urgent pointer field are suppressed in a transmission control protocol packet to form a modified packet;

at least one of a user datagram protocol length, a user datagram protocol checksum, and a 1 bit are inserted into the modified packet, so that the resulting packet becomes like a valid user datagram protocol datagram;

a protocol number of a header of the resulting packet is set to a specific value for user datagram protocol;

at least one of a sequence number, acknowledgement sequence number, data offset, transmission control protocol flags, window, parameters are re-arranged:

the user datagram protocol datagram has the same length as the original transmission control protocol packet;

multiplexing modified transmission control protocol frames with user datagram protocol packets to support user datagram protocol hole punching, comprising one or more or all of the following:

checking a length of a payload of a received user datagram protocol packet, checking a first bit of the payload when the length of the payload of the user datagram protocol packet is larger than a determined number of bytes, checking the user datagram protocol checksum, modifying the user datagram protocol packet to recover a transmission control protocol packet, comprising at least one of delivering the packet unmodified, if the first bit of the payload is zero, and ignoring the packet, if the user datagram protocol checksum is invalid, comprising modifying a received user datagram protocol packet to recover a transmission control protocol packet, comprising at least one of:

re-computing of the transmission control protocol checksum, setting a bit indicating urgent mode, and urgent pointer to zero, setting back a protocol value in the header, delivering the packet to a transmission control protocol state machine.

A computer program product or program or software may comprise software portions for carrying out one or more or all, or any of the above or below method or device features in any arbitrary combinations when run on a computer or processor.

Any disclosed features can be used or implemented alone or in any arbitrary combination with one or more of the other disclosed features.

Embodiments of the invention will be described below in more detail with reference to the drawings.

Figure 2:
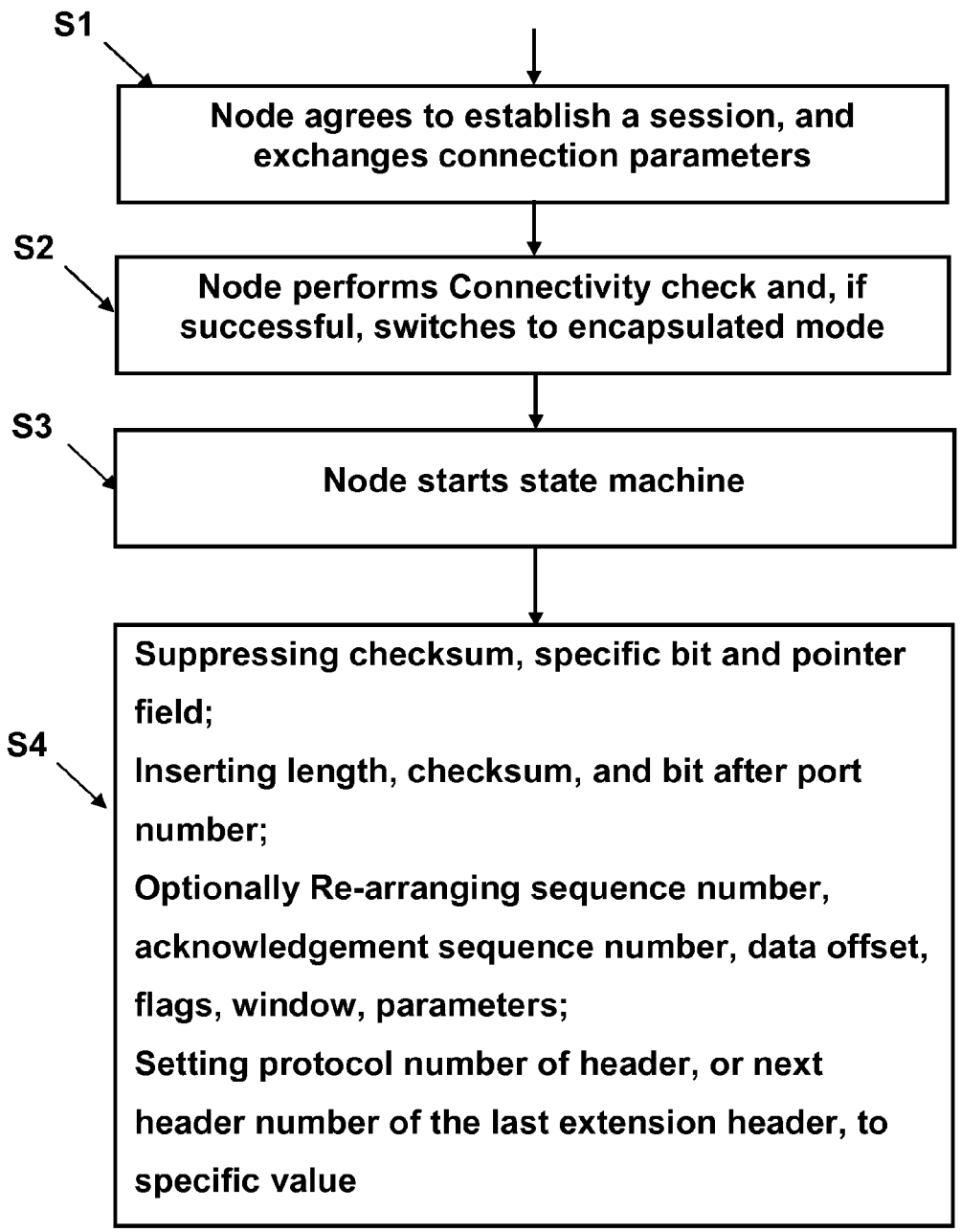

FIG. 1 illustrates an embodiment of an apparatus in accordance with the invention; and FIG. 2 shows an embodiment of a method in accordance with the invention.

DETAILED DESCRIPTION

FIG. 1 illustrates an embodiment of an apparatus in accordance with the invention. In this embodiment, the apparatus may be a node e.g. of a communication network, or part of a node or a device configured to at least one of receiving or transmitting packets or frames. The apparatus 1 of FIG. 1 has a transmitting or receiving, or transmitting and receiving part 2 (Tx, Rx) for receiving or sending TCP or UDP packets, frames or datagrams 3. Further, the apparatus 1 of FIG. 1 has a transmitting or receiving, or transmitting and receiving part 4 (Tx, Rx) for receiving or sending TCP or UDP packets, frames or datagrams 3.

The parts or sections 2, 4 may in another embodiment also be formed by one and the same section.

The apparatus 1 of FIG. 1 further comprises a modifier or modifying unit 5 for modifying the frames 3, e.g. the complete header or part of the header of the frames 3, and a controller or control unit 6 for controlling at least part or all of the apparatus 1 such as the modifying unit 5.

FIG. 2 illustrates an embodiment of a method in accordance with the invention. The embodiment comprises a step S1 in which a node such as apparatus 1 of FIG. 1 agrees to establish a session, and exchanges connection parameters. In step S2, the node performs a connectivity check and, if successful, may switch to encapsulated mode. In a step S3, the node starts a state machine.

In a step S4, the node 1 carries out one or more of the following in this or any arbitrarily changed sequence:

suppressing at least one of a checksum, specific bit and pointer field in a frame;

inserting into the frame at least one of a length, checksum, and bit, e.g. after a port number;

optionally re-arranging at least one of a sequence number, acknowledgement sequence number, data offset, flags, window, parameters;

setting a protocol number of header, or next header number of the last extension header, to a specific value.

In one or more embodiments of the invention, the steps of the method of FIG. 2 may comprise the following features.

Two nodes 1 first agree to establish some kind of session, for instance through the SIP protocol, and exchange connection parameters out-of-band (e.g. in a session description with SIP), typically ICE or ICE-TCP connection parameters. ICE is one example only. Embodiments of the invention are not restricted to the use of ICE. In other embodiments, other protocols or establishment procedures other than ICE may also be used.

In an ICE case, nodes run normal connectivity checks such as UDP-based ICE connectivity checks. If successful, they switch to encapsulated TCP (or SCTP) mode as specified below.

In ICE-TCP case, UDP-encapsulation of TCP is offered as one candidate in addition to other ICE-TCP candidate types (e.g. passive, active, simultaneous-open). When carrying-out connectivity checks of step S2 for the UDP-encapsulated candidate, STUN over normal UDP can be used, as in non-TCP ICE. If that candidate is selected at the end, nodes use encapsulated TCP as follows.

Each node starts a normal TCP state machine according to step S3. Whenever sending a TCP packet (whether it is signalling-only without data payload, or contains a data payload), at least one or more or all of the following modifications of step S4 are done in accordance with one, more or all of the embodiments of the invention:

the TCP checksum, URG bit indicating urgent mode, and urgent pointer field are suppressed if existent;

an UDP length, an UDP checksum, and a 1 bit are inserted after the port numbers, so that the packet becomes like a valid UDP datagram of the same length as the original packet;

sequence number, acknowledgement sequence number, data offset, TCP flags (except URG), window, parameters may be re-arranged for efficiency, so long as a standard layout is agreed upon;

finally, the protocol number of the IPv4 header (or next header number of the last IPv6 extension header, if any otherwise the next header number of the IPv6 header) is set to indicate UDP such as being set to 17 (UDP).

When receiving a UDP packet from the other node, one or more or all of the following steps may be carried out in arbitrary combination or sequence exchange.

First, the length of the payload of the UDP packet is checked. If the UDP packet does not contain at least a determined number of bytes, e.g. 12 bytes of payload, the UDP packet is delivered unmodified.

When the length of the payload of the UDP packet is larger than the determined number of bytes, the first bit of the payload is checked. If the first bit of the payload is zero, the packet is delivered unmodified. This is used to deliver STUN packets over UDP for example.

Then, the UDP checksum is checked. If the UDP checksum is invalid, the packet is ignored.

Otherwise, the inverse modifications are done to recover a TCP packet. The TCP checksum can be recomputed, the URG bit indicating urgent mode, and urgent pointer are assumed to be zero. The protocol value in the IP header is set back to indicate TCP such as set to 6 (TCP). The packet is then delivered to the TCP state machine.

Embodiments according to the invention work through a large number of network address translation, NAT, and firewall devices and e.g. through larger sets of deployed NAT, and firewall devices than e.g. the TCP Simultaneous Open mechanism.

The solution according to embodiments of the invention is generic and efficient. Further, it supports timestamps, window scaling, explicit congestion notification, ECN, and most TCP extensions including future extensions, and can be used with IETF ICE or any other STUN-based hole punching mechanism transparently.

Finally, it can easily be extended to provide SCTP traversal support in addition to TCP.

Optionally dedicated support for the above mapping may be provided in the TCP/IP stack or through a software library.

Embodiments in accordance with the invention such as described above may be integrated e.g. in SP Next-Generation Software Platform program ICE stack (libnice).

Embodiments of the invention allow to make end-to-end TCP connections between hosts that are both behind NATs. Many applications such as IM and file transfer may benefit from such capability. Embodiments do not simply propose to just run TCP on top of UDP, but provide mapping of certain TCP fields to UDP fields.

LIST OF ABBREVIATIONS

NAT/NAPT: Network Address (Port) Translation
IETF: Internet Engineering Task Force—http://www.ietforg
ICE: Interactive Connection Establishment—draft-ietf-mmusic-ice
TCP: Transport Control Protocol—IETF RFC793
UDP: User Datagram Protocol—RFC768
SCTP: Stream Control Transmission Protocol—RFC2960
SIP: Session Initiation Protocol—RFC326.

The invention claimed is:

1. An apparatus comprising a processor and a memory including computer program code, the computer program code configured, with the processor, to cause the apparatus to:
    modify a transmission control protocol packet so as to become a user datagram protocol datagram in response to determining that the user datagram protocol datagram has the same length as the original transmission control protocol packet,
    wherein the computer program code is further configured, with the processor, to cause the apparatus to modify a user datagram protocol packet to recover a transmission control protocol packet by performing at least one of:
        recomputing the transmission control protocol checksum,
        assuming a bit indicating urgent mode and urgent pointer to be zero,
        setting back a protocol value in the header, and
        delivering the packet to a transmission control protocol state machine; and
    wherein the computer program code is further configured, with the processor, to cause the apparatus to multiplex modified transmission control protocol frames with user datagram protocol packets to support user datagram protocol hole punching.

2. The apparatus of claim 1, wherein the computer program code is further configured, with the processor, to cause the apparatus to re-arrange at least one of:
    a sequence number,
    an acknowledgement sequence number,
    a data offset,
    one or more transmission control protocol flags, and
    one or more window parameters.

3. The apparatus of claim 1, wherein the computer program code is further configured, with the processor, to cause the apparatus to carry out one or more or all of the following, in response to receiving a user datagram protocol packet:
    checking a length of a payload of the user datagram protocol packet,
    checking a first bit of the payload when the length of the payload of the user datagram protocol packet is larger than a determined number of bytes, and
    modifying the user datagram protocol packet to recover a transmission control protocol packet.

4. The apparatus of claim 1, wherein the computer program code is further configured, with the processor, to cause the apparatus to deliver the packet unmodified, when the first bit of the payload is zero.

5. The apparatus of claim 1, wherein the computer program code is further configured, with the processor, to cause the apparatus to ignore the packet, in response to a user datagram protocol checksum being invalid.

6. The apparatus of claim 1, wherein the apparatus is a node, a part of a node, a chipset, or computer.

7. A method comprising:
    modifying, by an apparatus, a transmission control protocol packet so as to become a user datagram protocol datagram in response to determining that the user datagram protocol datagram has the same length as the original transmission control protocol packet, and further comprising:
modifying a received user datagram protocol packet to recover a transmission control protocol packet, comprising at least one of:
re-computing of the transmission control protocol checksum,
setting a bit indicating urgent mode and urgent pointer to zero,
setting back a protocol value in the header, and
delivering the packet to a transmission control protocol state machine; and
multiplexing modified transmission control protocol frames with user datagram protocol packets to support user datagram protocol hole punching.

8. The method of claim 7, further comprising:
arranging at least one of a sequence number, acknowledgement sequence number, data offset, transmission control protocol flags, and window parameters.

9. The method of claim 7, comprising one or more or all of the following:
checking a length of a payload of a received user datagram protocol packet,
checking a first bit of the payload when the length of the payload of the user datagram protocol packet is larger than a determined number of bytes, and
modifying the user datagram protocol packet to recover a transmission control protocol packet.

10. The method of claim 7, comprising at least one of delivering the packet unmodified, if the first bit of the payload is zero, and ignoring the packet, when a user datagram protocol checksum is invalid.

11. A computer program product comprising software portions for performing the features of any one of claims 7 to 10 when run on a computer or processor.

12. An apparatus comprising a processor and a memory including computer program code, the computer program code configured, with the processor, to cause the apparatus to:
modify a transmission control protocol packet so as to become a user datagram protocol datagram, and
output a modified packet with the user datagram protocol datagram, in response to determining that the user datagram protocol datagram has the same length as the original transmission control protocol packet, wherein the computer program code is further configured, with the processor, to cause the apparatus to modify a user datagram protocol packet to recover a transmission control protocol packet by performing at least one of:
recomputing the transmission control protocol checksum,
assuming a bit indicating urgent mode and urgent pointer to be zero,
setting back a protocol value in the header, and
delivering the packet to a transmission control protocol state machine,
wherein the computer program code is further configured, with the processor, to cause the apparatus to multiplex modified transmission control protocol frames with user datagram protocol packets to support user datagram protocol hole punching.

13. The apparatus of claim 12 wherein the computer program code is further configured, with the processor, to cause the apparatus to perform suppressing of a transmission control protocol checksum in a transmission control protocol packet to form the modified packet.

14. The apparatus of claim 12 wherein the computer program code is further configured, with the processor, to cause the apparatus to perform inserting at least one of a user datagram protocol length, or a logical 1-bit, into the modified packet, so that the resulting packet becomes a valid user datagram protocol datagram.

15. The apparatus of claim 12 wherein the computer program code is further configured, with the processor, to cause the apparatus to perform setting a protocol number of a header of the resulting packet to a specific value for user datagram protocol.

16. A method comprising:
modifying, by an apparatus, a transmission control protocol packet so as to become a user datagram protocol datagram; and
outputting, by the apparatus, a modified packet with the user datagram protocol datagram, in response to determining that the user datagram protocol datagram has the same length as the original transmission control protocol packet, and further comprising:
modifying a received user datagram protocol packet to recover a transmission control protocol packet, comprising at least one of:
re-computing of the transmission control protocol checksum,
setting a bit indicating urgent mode and urgent pointer to zero,
setting back a protocol value in the header, and
delivering the packet to a transmission control protocol state machine; and
multiplexing modified transmission control protocol frames with user datagram protocol packets to support user datagram protocol hole punching.

17. The method of claim 16 further comprising:
suppressing, by the apparatus, at least a transmission control protocol checksum in a transmission control protocol packet to form a modified packet.

18. The method of claim 16 further comprising:
inserting, by the apparatus, at least one of a user datagram protocol length, and a logical 1-bit, into the modified packet, so that the resulting packet becomes a valid user datagram protocol datagram.

19. The method of claim 16 further comprising:
setting, by the apparatus, a protocol number of a header of the resulting packet to a specific value for user datagram protocol.

* * * * *